E. J. LORENZ.
FLOAT GAGE.
APPLICATION FILED JULY 18, 1917.

1,323,882.

Patented Dec. 2, 1919.
3 SHEETS—SHEET 1.

INVENTOR
E. J. Lorenz,
BY Victor J. Evans
ATTORNEY

WITNESSES

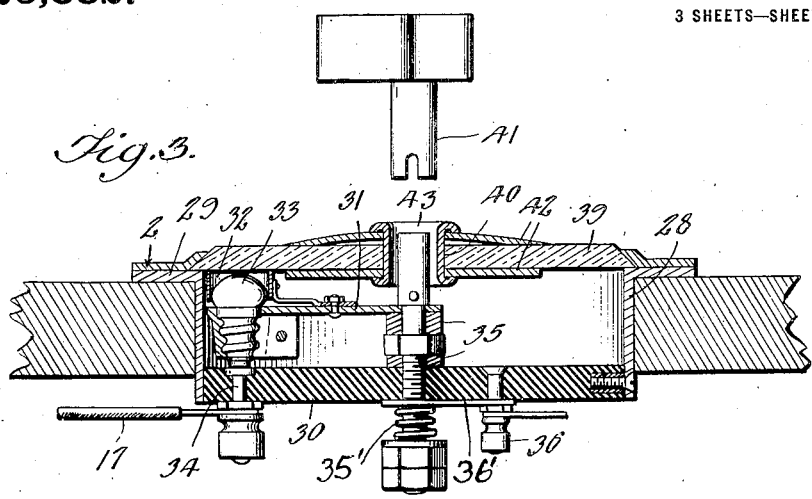

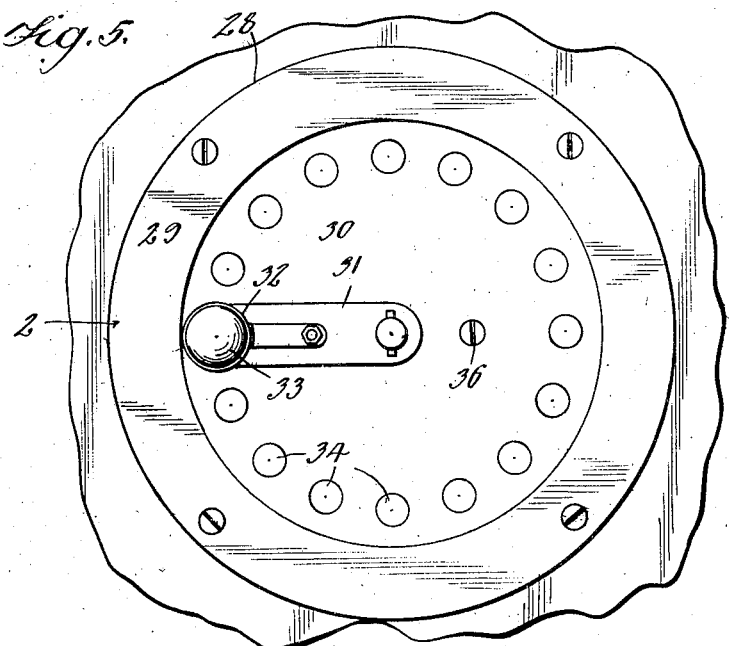
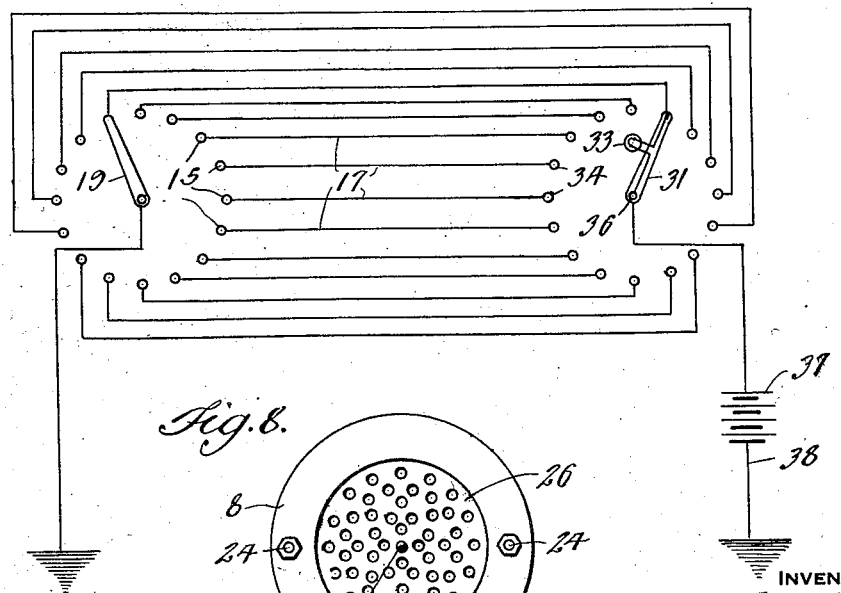
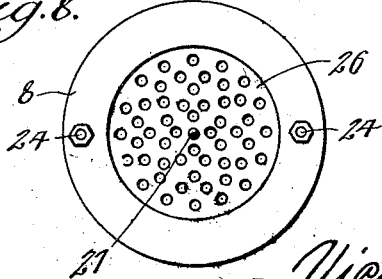

UNITED STATES PATENT OFFICE.

ELMER J. LORENZ, OF HOWELL, MICHIGAN; SAMUEL LORENZ, EXECUTOR OF SAID ELMER J. LORENZ, DECEASED, ASSIGNOR TO ED. LORENZ, OF EASBY, NORTH DAKOTA.

FLOAT-GAGE.

1,323,882.

Specification of Letters Patent.

Patented Dec. 2, 1919.

Application filed July 18, 1917. Serial No. 181,370.

*To all whom it may concern:*

Be it known that I, ELMER J. LORENZ, a citizen of Austria, residing at Howell, in the county of Livingston and State of Michigan, have invented new and useful Improvements in Float-Gages, of which the following is a specification.

This invention relates to improvements in indicating devices for liquid containers, and has particular reference to an electrical indicator gage for automobile gasolene tanks and the like.

It is my object to provide in the present invention an improved gage having an actuating unit which may be located in a tank and an indicating unit which may be located in any convenient position, as for instance on the dash of an automobile.

A further intention is to provide in such a gage means whereby a signal will be actuated upon the liquid in the tank attaining a predetermined low or high level.

I also propose to provide a device for setting the instrument to indicate such high or low level, which will prevent change of the setting by an unauthorized person; and further, to make provision for the effective display of visual signals to indicate the level either during the day or after dark.

With these and other objects in view, which will appear upon examination of the drawings and the accompanying specification and claim, I have embodied my invention in the form described below and delineated in the drawings, in which—

Fig. 3 is a vertical central sectional view of the indicator.

Fig. 4 illustrates the exterior of the indicator in plan.

Fig. 5 shows the indicator in plan with the face removed to expose the interior.

Fig. 7 is a diagrammatic view showing electrical connections.

Fig. 8 is a bottom plan of the tube.

Figure 1:
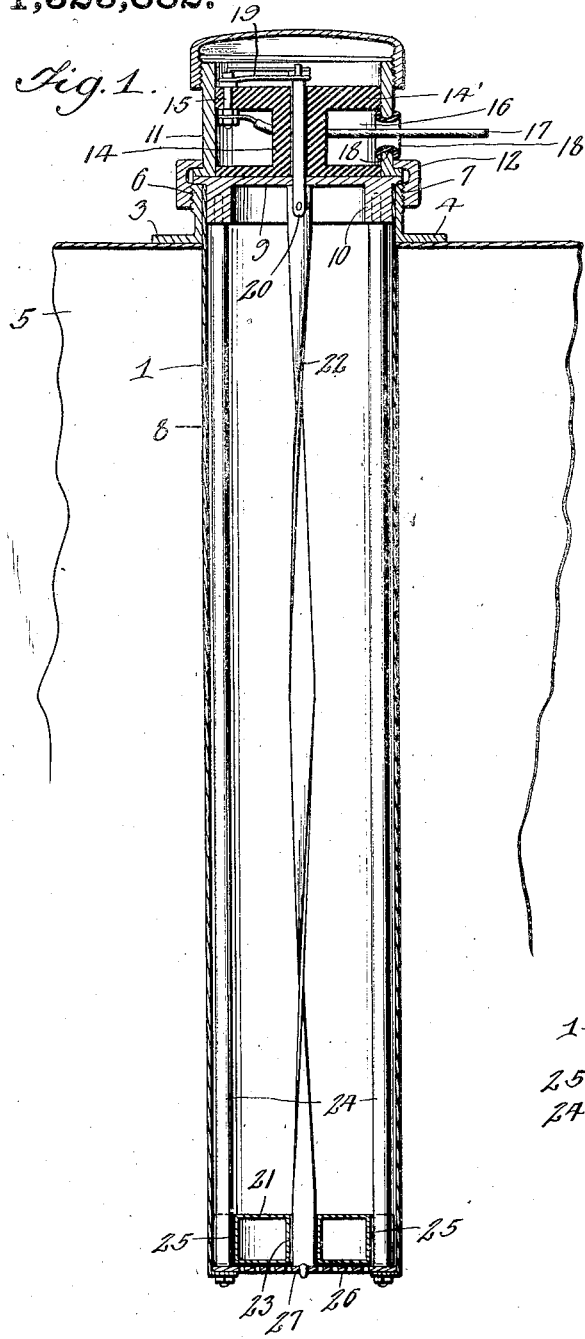
Figure 1 is a longitudinal sectional view of the tank with the device in section therein.
Figure 2:
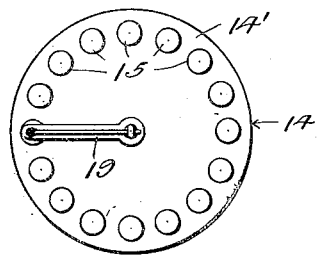
Fig. 2 is a plan view of the current distributing element.
Figure 6:
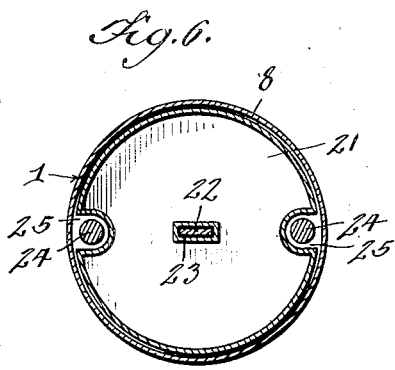
Fig. 6 is a transverse sectional view taken through the float of Fig. 1.

Referring to the drawings more particularly, the gage comprises a current distributing or actuating device 1 adapted for insertion in a tank or other fluid receptacle, and an indicating device 2 adapted for mounting upon the dash of an automobile or in any other convenient and readily observable location.

As here shown, the actuating device 1 is provided for attachment to a tank with an attaching member 3 having an annular shoulder 4 adapted to be soldered, riveted, or otherwise secured to the top wall of a tank 5, and having a collar 6 upstanding therefrom, formed externally with screw threads 7, and internally with a bore adapted to receive the extremity of a tube 8, which may extend downwardly through an opening formed in the top of the tank.

For closing the upper end of the tube, a cap 9 is provided, adapted to seat against and form a tight joint with the top of the collar, and having a shoulder extending within the tube adjacent the wall thereof.

A container for the distributing element is here shown as a cylinder 11 positioned upon the cap 9 concentrically thereto and formed exteriorly at the extremity adjacent the cap with a flange, and at the other extremity with screw threads constituting attaching means for a cap for protection of the distributer. A locking means for securing the various parts together consists in the present instance of an annular member 12, formed with screw threads adapted to engage the threads 7 on the collar, and having a lip for engagement with the flange of the distributer container, whereby the container, cap 9, and attaching member 3 may be drawn tightly together.

Within the container 11 is a contact supporting element, comprising in the present instance, a cylindrical body 14 of insulating material, adapted to be maintained concentrically to the container by an upper and a lower annular shoulder. Embedded in the surface of the upper shoulder 14' is an annular row of contact studs 15, each stud having a prolongation extending into the space 16 intermediate of the shoulders for connection to a respective conductor 17. The container is formed with a lateral opening 18 for leading out the conductors 17, and this opening may be conveniently provided with an insulating bushing 18', to prevent short circuiting of the conductors should the insulation become worn.

For engagement with the contact studs 15, a spring contact arm 19 is provided, attached for rotation to a spindle 20 extending downwardly into the tube through a bore, wherewith the body 14 and the cap 9 are formed. A float 21, of cork or other material such as commonly used for such purposes, is inserted in the tube 8 for vertical movement in accordance with changes of level of the liquid within the tank, and such float is provided with means to rotate the contact arm to correspond with such vertical movement. This object is effected in the present instance by a flat strip of metal 22, twisted longitudinally to form a spiral, and attached at the upper end to the spindle 20, and extending through a suitable slot 23, in the float. The pitch of the spiral 22 is correctly proportioned to the capacity of the tank to cause the contact arm to shift through an arc equal to that between adjacent contacts upon adding to or subtracting from the contents of the tank a unit quantity of liquid.

For preventing rotation of the float 21 in the course of a vertical movement, guiding means shown as rods 24 are provided within the cylinder, adapted to engage suitable slots or openings 24, wherewith the float may be formed longitudinally. The rods 24 are screw threaded into the shoulder 10 of the cap at the upper extremities, and have threaded upon the lower extremities clamping means shown as nuts whereby a perforated plate 26 is held in engagement with the lower end of the tube to lock the latter in position. The plate 26 is further formed centrally with a recess or bore 27 constituting a journal for the lower extremity of the spiral member 22.

The indicator 2 has a cylindrical body 28, adapted to enter a recess formed in the dash of an automobile or other convenient location and having a flange 29 adapted to coincide with the face of the dash and to be attached thereto by any suitable means such as screws inserted in openings wherewith the flange 29 may be formed. A disk 30 of insulating material is inserted in the cylinder to form a rear wall, and may be retained by screws or any other convenient securing devices.

Within the body 28 is a spring contact arm 31, mounted upon a spindle extending through an opening formed in the insulating disk 30. Toward the outer extremity, the contact arm 31 is provided with a receptacle 32 adapted to retain a minature electric lamp 33, whereby one terminal 33' of the lamp establishes connection with the contact arm while the other terminal 34 is positioned for successive engagement in a rotative movement of the arm 31 with a plurality of contact studs 34 inserted in the disk 30. The contact studs 34 are equal in number to the distributer contacts 15 and each stud 34 is provided with suitable means for connection to a respective distributer contact 15 through a conductor 17, such means being here shown as prolongations of the studs 34 extending through the disk 30 and adapted to constitute binding posts.

Suitable spacers 35 are positioned on the spindle between the contact arm and the disk, and externaly of the disk, a spring 35' is provided embracing the spindle, whereby longitudinal movement of the spindle is permitted, and the spindle is placed in good electrical connection with a conducting strip 36' extending across the disk for connection to a suitable binding post 36. One terminal of a source of electrical energy 37 suitable for energization of the lamp 33 is connected to the binding post 36, and the other terminal is grounded on the distributer 1 in any convenient manner, as by a conductor 38.

The indicator is provided with a face 39 of glass or other transparent or translucent material, and is formed with an opening 40 for insertion of a key 41 adapted to engage a prolongation of the spindle 32 for manual rotation of the contact arm. For preventing fracture of the face, I may provide on either side of the face a disk 42 formed with an opening coincident with the opening in the face, and may further utilize the outer disk to indicate the particular distributer contact 15 with which the contact arm is in connection, by means of numerals inscribed on the disk, wherewith a pointer on the key is adapted to coincide. To secure the disks in position, I may employ a bushing 43 inserted in the openings in the face and disks and having a rolled lip at either extremity for engagement with the respective disk.

The face is preferably of ruby colored material, as more readily attracting attention when illuminated in the daytime, and inscribed thereon are numerals 44 corresponding in location to the contact studs, and adapted to be illuminated by the lamp to show the particular distributer contact 15 with which the contact arm 31 may be connected, and thereby indicate the quantity of gasolene or other liquid in the tank.

While I have here shown and described the preferred form of my invention for purposes of illustration, such embodiment is not to be interpreted as in any way limiting the spirit of the invention, such limitation being confined to that indicated by the scope of the accompanying claim.

What I claim is—

An indicator comprising an insulated base, a casing supported by the base, a series of contacts carried by the base, an arm rotatably mounted in the base and insulated therefrom, a lamp mounted in the free end of the arm and having its respective terminals in electrical contact with the arm and with the base carried contacts, a transparent cover for the casing, through which the lamp is visible, indicating marks arranged on said cover, and means for normally operating the arm from beyond the cover.

In testimony whereof I affix my signature.

ELMER J. LORENZ.